US006817573B2

(12) United States Patent
Harrison et al.

(10) Patent No.: US 6,817,573 B2
(45) Date of Patent: Nov. 16, 2004

(54) AIRCRAFT

(75) Inventors: Richard George Harrison, Preston (GB); Terry Prendergast, Preston (GB); Geoffrey Salkeld, Preston (GB); Darren Holdcroft, Preston (GB)

(73) Assignee: Bae Systems plc, London (GB)

( * ) Notice: Subject to any disclaimer, the term of this patent is extended or adjusted under 35 U.S.C. 154(b) by 0 days.

(21) Appl. No.: 10/186,665

(22) Filed: Jul. 2, 2002

(65) Prior Publication Data

US 2003/0006340 A1 Jan. 9, 2003

(30) Foreign Application Priority Data

Jul. 3, 2001 (GB) .............................. 0116219

(51) Int. Cl.[7] .............................................. B64C 13/24
(52) U.S. Cl. ...................... 244/75 R; 244/120; 244/190
(58) Field of Search .......................... 244/36, 120, 124, 244/75 R, 23 B, 12.3, 55, 227, 229, 189, 190, 221, 78, 197

(56) References Cited

U.S. PATENT DOCUMENTS

| 2,181,574 A | * | 11/1939 | Burnelli ....................... 244/36 |
| 2,380,289 A | | 7/1945 | Burnelli |
| 2,417,189 A | * | 3/1947 | Cornelius ................... 244/120 |
| 2,423,090 A | | 7/1947 | Holloman et al. |
| 2,619,301 A | * | 11/1952 | Hall .............................. 244/2 |
| 2,991,026 A | * | 7/1961 | Nelson et al. ............. 244/12.4 |
| 3,017,137 A | * | 1/1962 | Helmke et al. ................ 244/2 |
| 3,193,218 A | | 3/1962 | Ernst et al. |
| 3,066,889 A | * | 12/1962 | Kelly ........................ 244/12.3 |
| 3,245,638 A | * | 4/1966 | Buchstaller ................ 244/12.3 |
| 3,669,385 A | | 6/1972 | Glantz et al. |
| 3,735,946 A | * | 5/1973 | Mullins ....................... 244/55 |
| 4,736,910 A | | 4/1988 | O'Quinn et al. |
| 5,531,402 A | * | 7/1996 | Dahl ........................ 244/75 R |
| 5,941,478 A | | 8/1999 | Schmittle |
| 5,975,464 A | | 11/1999 | Rutan |
| 6,056,237 A | | 5/2000 | Woodland |

FOREIGN PATENT DOCUMENTS

| GB | 527802 | 10/1940 |
| GB | 554084 | 6/1943 |
| GB | 831978 | 4/1960 |
| GB | 2272047 | 5/1994 |
| GB | 2353018 | 2/2001 |
| WO | 00/64736 | 11/2000 |

* cited by examiner

*Primary Examiner*—Galen Barefoot
(74) *Attorney, Agent, or Firm*—Crowell & Moring LLP

(57) ABSTRACT

An aircraft 1 comprising interchangeable wings 5 detachedly connected to a fuselage 3, each wing 5 containing the fuel and flight systems 13,15 for engines 7 mounted to the wings 5, so that the fuselage 3 need contain no flight systems, simply a "bus" 23 for communication and the transfer of data between the wings.

7 Claims, 2 Drawing Sheets

AIRCRAFT

Figure 1:
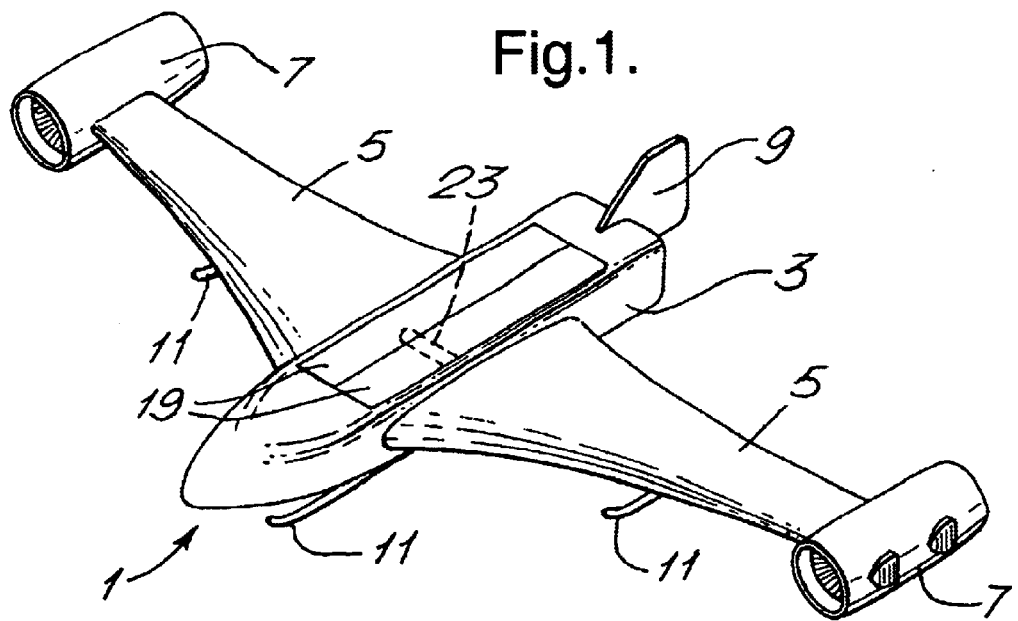

This invention relates to an aircraft, in particular to an unmanned aerial vehicle (UAV).

UAVs are employed in a variety of roles, such as reconnaissance/surveillance or for delivering a payload in the form of a munition or goods such as stores. Traditionally, UAVs are specifically designed for the roles they are intended for, so that a surveillance UAV is typically designed so as to have a high endurance (and so usually has a relatively low flight speed), whereas a "strike" UAV (for delivering a warhead) will usually be designed for relatively high speed flight, so as to minimise vulnerability of the UAV to anti-aircraft measures. This diversity of UAV design tends to inhibit the full exploitation of UAVs.

It is an object of the present invention to provide an aircraft which is sufficiently versatile to encourage and facilitate wider use of UAVs.

According, the present invention provides an aircraft comprising at least one pair of wings comprising means for propelling the aircraft in flight, means for controlling the propulsion means and for controlling the aircraft in flight, and a fuselage, wherein each wing is detachably connected to the fuselage, the control means are located within the wings and the fuselage comprises means for connecting the control means and the propulsion means in the associated wings of each pair of wings thereby to enable controlled flight of the aircraft.

With such an arrangement, a UAV can be configured and used with one fuselage in one role, and rapidly re-configured using a different fuselage and the same set of wings for a second role—the UAV could deliver a payload of stores and be reconfigured (by connecting the wings to another fuselage) as a "cruise"-type missile, for example (reconfiguration would be carried out on the ground, as opposed to in flight). In addition, the module arrangement of the wings and fuselage enables quicker and simpler repair and maintenance; in the event one propulsion means (engine) is faulty, or one wing is damaged, the aircraft can be made airworthy rapidly and easily merely by replacing the whole wing.

Preferably the wings contain the fuel tanks. This means that the fuselage can be made as elementary as possible; apart from the connecting means, or "bus", which allows the intercommunication and control of each pair of wings and engines necessary for unmanned flight, the fuselage is little more than an aerodynamically-shaped container, which can be adapted according to the role of the UAV and the payload to be carried.

The propulsion means may be rotatable about an axis perpendicular to the direction of forward flight of the aircraft, and/or means may be provided selectively to divert efflux from the propulsion means, thereby selectively to provide propulsion of for forward flight or for vertical take-off and/or landing of the aircraft.

These arrangements, which ideally would utilise technology already in use in manned VTOL/VSTOL (vertical take-off and landing, vertical/short take off and landing) aircraft, allow the UAV to be used in a VTOL or VSTOL role with the consequent advantages thereof (no need for a prepared runway, therefore allowing the UAV to operate from or to a remote site, behind enemy lines, onboard a ship and so on).

It has already been explained how the fuselage may be simple in design; where a role requires a substantial payload to be carried, two or more fuselages may be connected together, between a pair of wings thus increasing the maximum payload. Connection of the fuselages and of the pair of wings would be by way of the means provided on the fuselage for connection to the wings and the aircraft "bus" respectively.

However the aircraft is configured it will also preferably comprise other conventional aircraft features, such as a tail fin, movable control surfaces (which may be integral with the wings) and an undercarriage. Because an undercarriage is only required where the UAV is not used in a sacrificial role (i.e. as a missile), in the interest of maximising versatility it would be preferable for the undercarriage to be integral with the fuselage, so that only a fuselage adapted for a repeated use role need be provided with an undercarriage, whereas for a missile role there need be no undercarriage and the fuselage could be specially designed for its "strike" role.

Figure 2A:
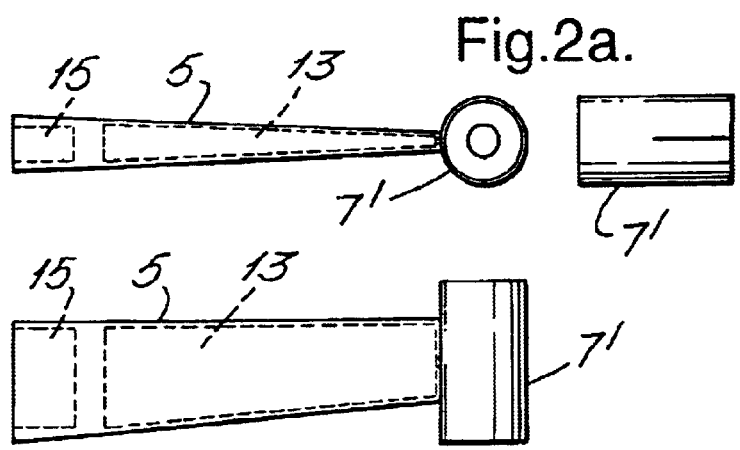
Figure 3:
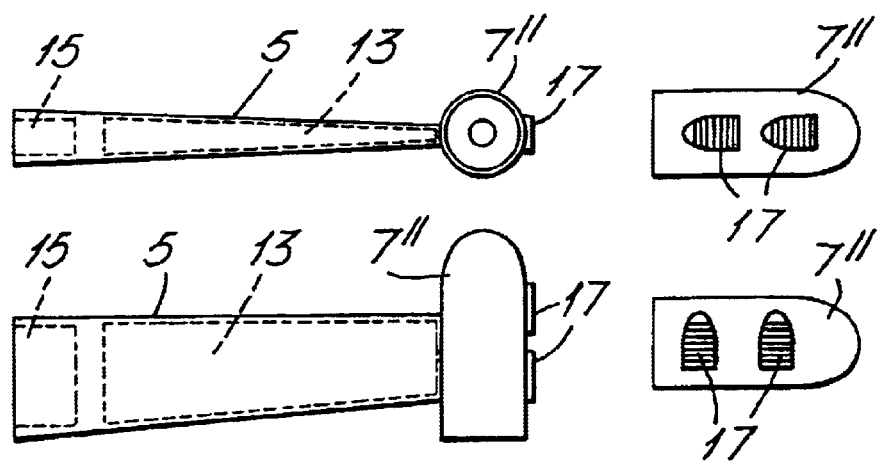
Figure 4:
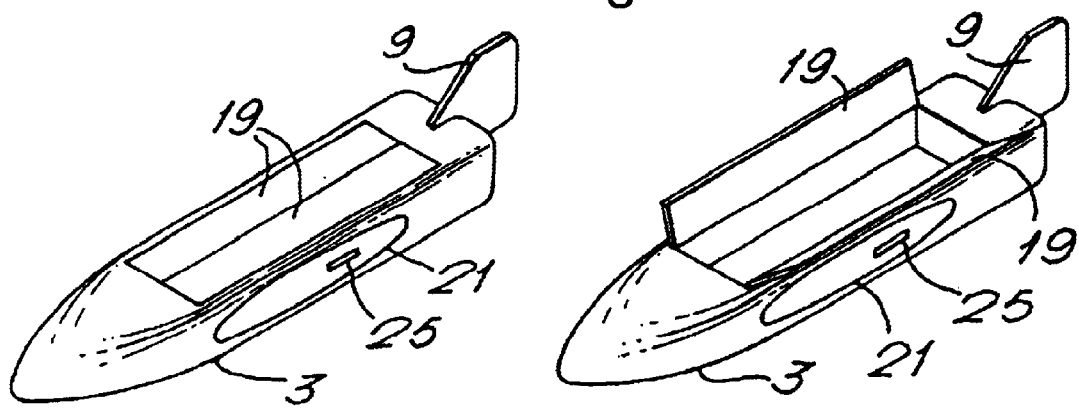
Figure 5:
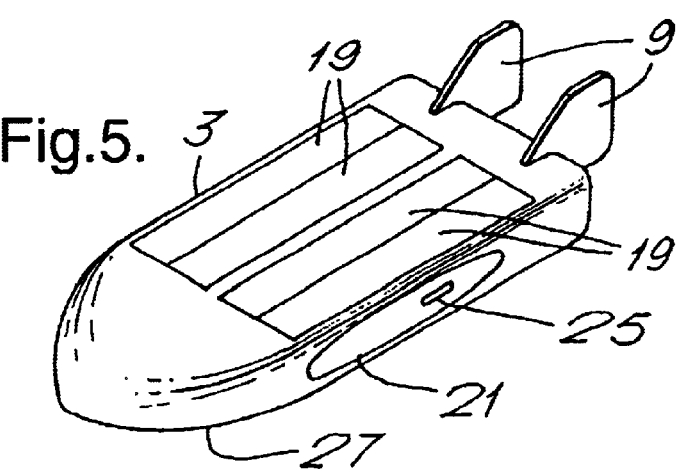

The invention will now be described by way of example and with reference to the accompanying drawings, in which:

FIG. 1 is a schematic illustration of an unmanned aircraft in accordance with the invention;

FIGS. 2A and B are schematic front, plan and side views of a wing forming part of an aircraft in accordance with the invention and having a rotationally mounted engine on the outboard wing tip, arranged for forward flight and for vertical flight respectively;

FIG. 3 comprises schematic front, plan and side views of a wing similar to that of FIGS. 2A and B but having a fixed engine on the outboard wingtip but provided with vectorable nozzles, for selective horizontal or vertical flight;

FIG. 4 is a schematic view of a fuselage for use with the wings of FIGS. 2 and 3, and FIG. 5 is a schematic view of a fuselage formed by connecting together two of the fuselages of FIG. 4.

FIG. 1 shows an aircraft 1 in accordance with the invention, comprising a fuselage 3 and a pair of wings 5. Engines 7 are mounted to the outboard tips of the wings 5, and the aircraft has a tail plane 9 and undercarriage 11, as [are] is further described below. The wings 5 are detachably connected to the fuselage 3, and contain all the fuel and flight systems (see FIGS. 2a, 2b and 3) for the aircraft to fly in an unmanned role, so that the fuselage 3 need contain no flight systems whatever apart from an aircraft "bus" (not shown) to allow communication and data transfer between the flight systems in the wings. Accordingly, the fuselage can have the maximum capacity, and the complete arrangement permits interchangability of fuselages and wings, rending the aircraft more versatile and improving its availability when compared with conventional UAV's.

Figure 2B:
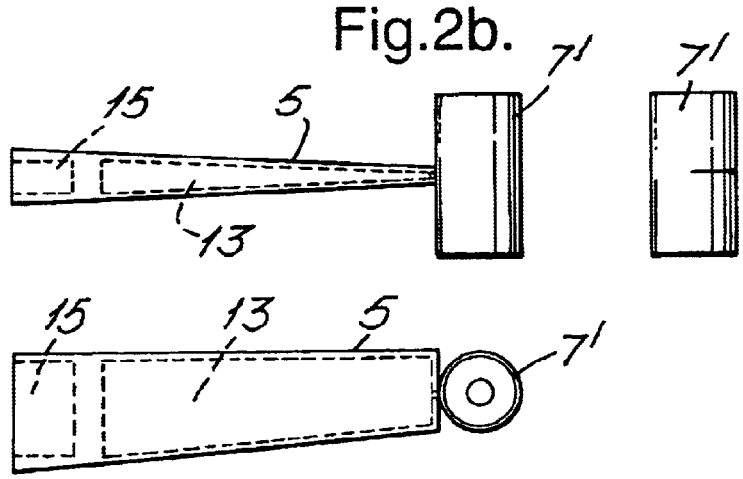

Referring now to FIGS. 2A and 2B, these show (in a clockwise direction from the bottom) a plan view, a front view and a side view of a wing 5 in two modes of operation. In the first mode, in FIG. 2A, the wing 5 is arranged for normal, forward flight; FIG. 2B shows the wing 5 arranged for vertical flight, as may be required for the aircraft to take off or land.

The wing 5 contains fuel tanks 13 and a compartment 15 to contain the flight control systems for the aircraft. The engine 7' is a conventional aeroengine, mounted pivotably to the wing tip so as to allow at least 90° rotation, between the horizontal and vertical positions, with fuel being supplied to the engine through the pivot joint (not shown).

FIG. 3 illustrates the same three views as FIGS. 2A or 2B, with an additional view showing the arrangement when vertical thrust is required, of a wing 5 that is almost identical to that of FIGS. 2A and 2B apart from there being a different engine 7". Instead of being pivotably mounted to the wingtip, engine 7" is provided with vectorable exhaust or thrust nozzles 17 as are well-known in the art in VTOL/VSTOL aircraft. These nozzles 17 are shown in the upper right hand view directed for standard forward flight, and shifted in the view below for vertical flight.

FIG. 4 shows a fuselage 3 with load doors 19 located on the top of the fuselage 3 closed in the left hand view and open in the right hand view. The fuselage 3 has sockets 21 for accepting the wing roots and having connectors 25 for detachably connecting wings thereto and or electrical/electronic connection "bus" 23 for allowing the flight system in the wings to communicate.

It will be readily understood that the fuselage 3 can be designed for a particular aircraft role, such as for carrying food and medical devices, sensitive equipment (for surveillance, for example) munitions or even personnel. The pivoting engine/exhaust nozzle arrangements give the aircraft a VTOL/VSTOL capability and all the advantages arising from this.

FIG. 5 shows how a pair of fuselages 3 may be detachably connected together (by means of the connectors 21 described above) so as to increase the aircraft payload. For improved aerodynamic performance a streamlined nose cone 27 is attached to the front of the two fuselages. It will be realised that potentially any number of fuselages might be so connected, provided that the combined weight is within the load capacity of the wings and engines.

Aircraft in accordance with the invention which are intended to land and take off again are preferably provided with an undercarriage 11 (see FIG. 1). This could be fairly rudimentary, such as in the form of returnable cushioned skids. The cushioning provides a relatively soft landing for the payload while the skids are retractable so as to maintain a low aerodynamic profile when the aircraft is in flight. As shown, skids may be provided on both the fuselage 3 and the wings 5, however skids could easily be provided on only one or other of the wings and fuselage, or there may be no need for any undercarriage (where the aircraft is a missile, for example).

In operations other than war, the aircraft can be used for roles including the transfer of goods to remote areas (villages in developing areas, oil rigs, ships with a heli-pad, etc) and medical evacuation (from disaster zones or areas difficult to access—e.g. earthquake areas where roads are inaccessible, building top when lower levels of the building are on fire, etc).

What is claimed is:

1. An aircraft comprising:

at least one pair of wings, each wing comprising means for propelling the aircraft in flight and control means for controlling the propulsion means and for controlling the aircraft in flight; and a fuselages; wherein each wing is separately detachably connected to the fuselage;

the control means are located within the wings; and the fuselage comprises means connecting the control means and the propulsion means in the associated wings of each pair of wings, thereby to enable controlled flight of the aircraft.

2. An aircraft as claimed in claim 1 wherein the wings contain fuel tanks for the associated propulsion means.

3. An aircraft as claimed in claim 1 wherein the propulsion means are rotatable about an axis perpendicular to the direction of forward flight of the aircraft, thereby selectively to provide propulsion for forward flight or for vertical take off and landing of the aircraft.

4. An aircraft as claimed in claim 1, wherein means are provided selectively to divert efflux from the propulsion means, thereby selectively to provide propulsion for forward flight or for vertical take off and landing of the aircraft.

5. An aircraft as claimed in claim 1 wherein the fuselage comprises at least two container modules detachably connected together.

6. An aircraft as claimed in claim 1 comprising an undercarriage adapted to facilitate take-off and landing of the aircraft, the undercarriage being integral with the fuselage.

7. An aircraft comprising:

a fuselage;

a pair of wings;

propulsion means mounted on each wing of said pair of wings, for propelling the aircraft in flight;

control means contained within each wing of said pair of wings, for controlling the propulsion means and for controlling the aircraft in flight; and means contained within the fuselage, for connecting the control means and the propulsion means in the respective wings of said pair of wings, to control flight of the aircraft; wherein each wing of said pair of wings is separately and detachably connected to the fuselage; and said pair of wings is coupled to the fuselage in such a manner that it is interchangeable with another pair of wings.

\* \* \* \* \*